(12) United States Patent
Mackie et al.

(10) Patent No.: US 9,435,319 B2
(45) Date of Patent: Sep. 6, 2016

(54) WIND POWER GENERATION ASSEMBLY

(71) Applicants: Thomas Mackie, Mazomanie, WI (US);
Brent Harper, Mazomanie, WI (US);
Tim Holzmann, Mazomanie, WI (US)

(72) Inventors: Thomas Mackie, Mazomanie, WI (US);
Brent Harper, Mazomanie, WI (US);
Tim Holzmann, Mazomanie, WI (US)

( * ) Notice: Subject to any disclaimer, the term of this patent is extended or adjusted under 35 U.S.C. 154(b) by 0 days.

(21) Appl. No.: 13/874,782

(22) Filed: May 1, 2013

(65) Prior Publication Data

US 2013/0292942 A1 Nov. 7, 2013

Related U.S. Application Data

(60) Provisional application No. 61/640,885, filed on May 1, 2012.

(51) Int. Cl.
| | | |
|---|---|---|
| F03D 11/00 | (2006.01) | |
| F03D 7/02 | (2006.01) | |
| F03D 9/00 | (2016.01) | |
| F03D 3/04 | (2006.01) | |

(52) U.S. Cl.
CPC ............ *F03D 7/0204* (2013.01); *F03D 3/0463* (2013.01); *F03D 9/002* (2013.01); *F05B 2240/941* (2013.01); *Y02E 10/74* (2013.01)

(58) Field of Classification Search
CPC ...................................................... F03D 11/00
USPC .......................................................... 415/4.2
See application file for complete search history.

(56) References Cited

U.S. PATENT DOCUMENTS

| | | | | |
|---|---|---|---|---|
| 556,396 | A * | 3/1896 | Auld ............................. | 416/142 |
| 1,463,924 | A * | 8/1923 | Yukiteru ....................... | 415/4.4 |
| 4,156,580 | A * | 5/1979 | Pohl .......................... | F03D 3/02 |
| | | | | 290/55 |
| 4,282,944 | A * | 8/1981 | Trumpy ......................... | 180/2.2 |
| 4,474,529 | A * | 10/1984 | Kinsey ........................... | 415/4.2 |
| 4,486,143 | A * | 12/1984 | McVey .......................... | 415/164 |
| 4,527,950 | A * | 7/1985 | Biscomb ...................... | 416/117 |
| 4,616,973 | A * | 10/1986 | Souchik, Jr. .......... | F03D 3/0427 |
| | | | | 415/4.1 |
| 4,681,512 | A * | 7/1987 | Barnard .................... | 416/132 B |
| 4,764,683 | A * | 8/1988 | Coombes .............. | F03D 3/0454 |
| | | | | 290/44 |
| 5,037,268 | A * | 8/1991 | Fenlon ................... | F03D 3/002 |
| | | | | 415/2.1 |
| 5,171,127 | A | 12/1992 | Feldman et al. | |
| 5,375,968 | A * | 12/1994 | Kollitz et al. ................ | 415/2.1 |
| 6,283,710 | B1 * | 9/2001 | Biscomb .................. | 416/132 B |
| 7,303,369 | B2 * | 12/2007 | Rowan et al. ................ | 415/4.2 |
| 7,488,150 | B2 * | 2/2009 | Krippene ....................... | 415/4.2 |
| 7,744,338 | B2 * | 6/2010 | DeRuyter ............. | F03D 3/0454 |
| | | | | 415/2.1 |
| 2003/0175109 | A1* | 9/2003 | Brock et al. .................. | 415/4.2 |
| 2004/0057830 | A1* | 3/2004 | Boatner ......................... | 416/61 |
| 2005/0263057 | A1* | 12/2005 | Green ........................ | 114/102.1 |
| 2009/0324383 | A1* | 12/2009 | Mazur ............................ | 415/4.2 |

(Continued)

FOREIGN PATENT DOCUMENTS

| | | | | |
|---|---|---|---|---|
| EP | 2078853 | A1 * | 7/2009 | ............... F03D 5/04 |
| WO | WO 2014195640 | A1 * | 12/2014 | ............. F03D 3/061 |

OTHER PUBLICATIONS

Wikipedia; Wind Turbine; Sep. 16, 2014; pp. 1-15; http://en.wikipedia.org/wiki/Wind_Turbine.

*Primary Examiner* — Joseph Waks
(74) *Attorney, Agent, or Firm* — Zarley Law Firm, P.L.C.

(57) ABSTRACT

A wind power generation assembly having a rotatable base. Attached to the base are a plurality of arcuate panels that surround a turbine assembly. The center axis of the base and the center axis of the turbine assembly are offset. The panels are positioned to capture the wind and redirect the wind energy to the turbine assembly.

16 Claims, 8 Drawing Sheets

(56) References Cited

U.S. PATENT DOCUMENTS

| | | | |
|---|---|---|---|
| 2010/0078943 A1* | 4/2010 | Chetwood | 290/55 |
| 2010/0295316 A1* | 11/2010 | Grassman | 290/55 |
| 2011/0163551 A1* | 7/2011 | King | F03D 3/005 290/55 |
| 2012/0328435 A1* | 12/2012 | Crocker et al. | 416/23 |
| 2013/0115086 A1* | 5/2013 | Hench | 416/132 A |

* cited by examiner

WIND POWER GENERATION ASSEMBLY

CROSS REFERENCE TO RELATED APPLICATION

This application claims the benefit of U.S. Provisional Application No. 61/640,885 filed May 1, 2012.

BACKGROUND OF THE INVENTION

This invention is directed toward a wind power generation assembly. More specifically, and without limitation, this invention relates to a scalable, reliable, and economical wind power generation assembly which utilizes sails to channel wind to a turbine assembly to convert the energy in the wind into safe, inexpensive, and point-of-use electrical power.

Throughout the previous decades, the growing scarcity, increased costs, and adverse environmental impact associated with traditional reliance upon non-renewable sources of energy, particularly fossil fuels, represent meaningful, if not acute incentives for the development of viable renewable energy sources. One of the most preferred and promising sources of renewable energy is wind. Wind is the leading candidate for global renewable energy for both developed countries that are attempting to reduce dependence on fossil fuels as well as developing countries seeking point-of-use electrical power generation in order to avoid the high costs of a power grid infrastructure.

However, wind as a renewable energy source is currently hampered by poor return-on-investment for most locations in the world, and existing wind power generation systems are plagued by severe drawbacks in terms of complexity, safety, reliability, serviceability, noise, strobing, high-wind intolerance, and size. Wind turbine requirements, particularly for non-wind farm applications, include reasonable payback which is influenced by factors such as ease and cost of manufacture, reliability, cost of installation, cost of energy conversion and storage, insurance, and efficiency, irrespective of and apart from the need to be dependent on government subsides. Another requirement of wind turbines is reliability, which includes the number of moving parts, size, stresses and torques even at high wind velocities. Safe operation in icy, rainy, snowy, and high-wind conditions represents another requirement of wind turbines, as well as the additional requirement of the need to be homeowner-friendly in terms of ease to installation, ease of servicing/repair, quiet and safe operation, and visual appeal. Finally, wind turbines must be environmentally friendly which includes considerations such as any impact on local wildlife and further turbines must have little to no impact on navigation or weather radar. Existing wind turbine solutions struggle to meet these requirements, largely because much of the effort has been for wind farms or for one-off private, off-grid use.

Furthermore, in order for wind power to be a viable, long-term solution, it must have a good return on investment or have a low cost per kWh over the life of the turbine. Most of the industry's focus has been on taking advantage of economy of scale for horizontal-axis wind turbines (HAWTs), which represent the most efficient and thus the most common and widely utilized turbines. In addition, HAWTs can be made very large which contributes to available output torque. The foregoing considerations of turbine size as well as economies of scale have provided existing HAWT systems and implementations with the ability to produce relatively inexpensive electricity.

However, such HAWTs are characterized by considerable drawbacks. Given the industry's focus on economies of scale, innovation in terms of design has focused primarily on making, controlling, and transporting blades. As a result, blade design has become extremely complicated, which has led to an array of additional problems. The large HAWT blades are cantilevered and are subject to high stresses, present safety issues as accumulated ice can build up on the blades and fly off at high speeds, cause a hazard for fauna, produce significant audio noise and visual distractions such as a strobing effect, and can have a significant impact on both aircraft navigation and weather radar.

Existing HAWTs provide additional problems, which due to their blade and overall size have required significant efforts to deal with high winds. Additionally, power conversion represents another drawback of HAWTs; because the mechanical energy is rotating around an axis parallel to the ground, such energy must be either converted with a right-angle gearbox or converted to electrical energy in the rotating structure, causing additional problems with serviceability, cost due to the extra weight or parts, and reliability. Therefore there exists a need in the art that addresses these problems.

Therefore a primary object of this invention is to provide a wind power generation assembly which effectively converts wind energy into electrical power more economically at a lower cost per kWh over the life of the assembly.

Another object of this invention is to provide a reliable wind power generation assembly which utilizes proven and inexpensive technology for electrical power generation.

It is yet another object of this invention to provide a wind power generation assembly which minimizes the complexity and number of individual parts as well as size, stresses, and torques such that the assembly is equipped to convert the energy in the wind into electrical power at high wind velocities.

It is yet another object of this invention to provide a wind power generation assembly which has a low manufacturing, installation, energy conversion, and storage cost, is easy to use, install, service and operate and additionally is quiet, safe, visually appealing and environmentally friendly, having no adverse impact on the environment, wildlife, or navigation or weather radar.

A further object of the present invention is to provide a scalable and portable wind power generation assembly which provides robust construction capable of point-of-use operation in a variety of harsh conditions.

These and other objects, features or advantages of the present invention will become apparent from the specification and claims.

SUMMARY OF THE INVENTION

A wind power generation assembly having a rotatable base. Attached to the base are a plurality of arcuate panels that surround a turbine assembly. The center axis of the base and the center axis of the turbine assembly are offset. The panels are positioned to capture the wind and redirect the wind energy to the turbine assembly.

DETAILED DESCRIPTION OF THE PREFERRED EMBODIMENT

Referring to the figures, in a first embodiment, a wind power generation assembly 10 includes a rotatable platform or base 12 which utilizes a plurality of arcuate, contoured panels 14, which align with a prevailing wind to channel and direct wind to a turbine assembly 16. The rotatable platform or base 12 is rotatable about a center axis 18 and includes a substantially planar top surface 20. The rotatable platform or base 12 has an arcuate or circular longitudinal profile and outer circumferential edge 22 which extends from the planar top surface 20 to a substantially planar bottom surface 24 or underside. Alternatively, the longitudinal profile of the rotatable platform or base 12 could be semicircular, elliptical, and/or rectangular with straight and/or arcuate outer edges without departing from the spirit and scope of the present invention.

The wind power generation assembly 10 also includes a turbine assembly 16. The turbine assembly 16 includes a wind turbine 26 rotatably mounted to and extending upward from the top surface 20 of the rotatable platform or base 12 along a center axis of the turbine 28. The wind turbine 24 in a preferred embodiment is a vertical-axis wind turbine (VAWT) which includes a base 30 attached to the rotatable platform 12, an upper end 32 above the platform 12 having an optional end cap 34, and an outer cylindrical housing 36 disposed there between which rotates about its center axis 28. In another embodiment the turbine assembly 16 includes twin VAFTs without falling outside the scope of this invention.

The outer cylindrical housing 36 includes a plurality of circumferentially spaced, annularly arranged, angled and/or arcuate blades 38. The blades extend radially in a uniformly angled array from an inner wall 40 of the cylindrical housing 36 to an outer wall 42 of the cylindrical housing 36 with gaps or openings 44 between successive blades 38 such that air or current flows channeled radially into the housing 36 via the panels 14 to engage the plurality of blades 38 to rotate the VAWT 16 about its vertical center axis 28 of rotation. Preferably the VAWT is mounted on the upper surface 20 of the rotatable platform or base 12 such that the VAWT 16 and its center axis 28 are centrally offset from the center axis 18 of the rotatable platform or base 12 and located on one side of a transverse or lateral center axis of the rotatable platform or base 12 along an axis perpendicular thereto. The offset utilizes the wind to align the turbine 26 to the prevailing wind. Alternately, the offset may be reduced or made zero by motorizing and actively controlling the alignment of the turbine 26. The turbine assembly 16 additionally includes a slip ring operatively associated with and electrically connected to the rotating cylindrical housing 36 to transmit collected electrical energy generated via the turbine 24 off of the rotating platform 12.

Also included in the present embodiment of the wind power generation assembly 10 are a plurality of panels 14. Each of the plurality of panels 14 include an arcuate, contoured body 46 which forms a wind channeling surface 48 which is generally transverse to the planar top surface 20 of the rotatable platform 12 or base as well as the direction of the prevailing wind. Preferably, each of the panels 14 are formed as contoured sheet segments or sails having a planar, arcuate body 46 with a semicircular, curved surface area and a transverse, wind engaging profile which extends tangientially and radially outward from an interior position adjacent the outer circumference of the wind turbine 24 to a terminal free end attached to an interior portion of the planar top surface 20 or outer circumferential edge 18 of the rotatable platform or base 12.

Each arcuate, contoured body 46 includes a substantially concave wind engaging surface 48 on one side of the body 36 and a uniformly convex surface 50 on the opposite side thereof. The outer periphery of each body 46 is defined by a lower edge 52, an upper edge 54, and a side edge 56. The side edge 56 of each arcuate, contoured body 46 is held and supported in an upright orientation via a pole or mast 58 which extends perpendicularly upward from the planar top surface 20 of the rotatable platform 12 and attaches to the panel's arcuate, contoured body 46 along its side edge 56. The lower edge 52 of each arcuate, contoured body 46 extends outward from a lower end of the mast 58 along the planar top surface 20 of the rotatable platform 12 to a terminal free end 60 of the contoured body 46 which is attached to the top surface 20 of the rotatable platform 12, either at an interior portion or at an outer circumferential edge 22 thereof. The upper edge 54 of each arcuate, contoured body 46 extends outward and longitudinally downward in a curvilinear fashion from an upper end of the mast 58 to the terminal free end 60 of the contoured body 46 attached to the top surface 20 or outer edge of the rotatable platform 12, thus providing each contoured body 46 with a substantially triangular profile with a contoured, arcuate upper edge 54.

In one embodiment, each mast 58 is positioned adjacent the outer circumference of the wind turbine assembly 16 and extends upward along the outer periphery of the turbine assembly 16 to an upper end beyond the upper end of the turbine 24. Thus the arcuate, contoured bodies 58 of the panels 14 extend arcuately and tangientially outward and longitudinally downward from the turbine 24 to the top surface of the rotatable platform 12. Preferably, at least two front wind-channeling arcuate, contoured bodies 58 extend outward toward the outer circumferential edge 22 of the platform or base 12 from initial positions adjacent a front peripheral edge of the turbine 24 in between the center axis 18 of the platform 12 or base and the center axis 28 of the turbine 24 to terminal ends 60 at the outer circumferential edge 22 and between the outer circumferential edge 22 of the platform 12 and the platform's center axis 18 on one side of the platform 12. Thus the substantially concave wind engaging surfaces 48 are oriented to obliquely face the center axis 18 of the platform 12 to direct and channel prevailing wind to the turbine 24. Alternatively the masts 58 are mounted and positioned adjacent an outer edge 22 of the base 12 to similarly channel wind to the turbine 24. Again, the offset of the turbine assembly 16 from the platform 12 may be reduced or made zero by motorizing and actively controlling the alignment of the turbine assembly 16.

Additionally, at least one rear wind-channeling arcuate, contoured body 46 extends outward toward the outer circumferential edge 22 of the platform or base 12 from an initial position adjacent a rear peripheral edge of the turbine 24 in between the outer circumferential edge 22 of the platform 12 and turbine's center axis 28 to a terminal end 60 at the outer circumferential edge 22 of the platform or base 12 on a side of the platform 12 opposite the front wind-channeling arcuate, contoured bodies 56. Thus the substantially concave wind engaging surface 48 is oriented to obliquely face the center axis 18 of the platform 12 to direct and channel prevailing wind to the turbine 24 from a side of the turbine 24 opposite the front wind-channeling arcuate, contoured bodies 46.

Finally, at least one rear, pressure reducing arcuate, contoured body 46 or airfoil extends outward from an initial position adjacent a front peripheral edge of the turbine 24 behind the front wind-channeling arcuate, contoured bodies 46 to a terminal end 60 at the outer circumferential edge 22 of the platform or base 12 such that its substantially concave surface 48 is oriented to face away from the center axis 18 of the platform or base 12 and includes an opposite facing orientation with respect to the concave surfaces 48 of the front and rear wind-channeling arcuate, contoured bodies 46 such that the rear, pressure reducing arcuate, contoured body 46 creates a low pressure region behind the turbine 24.

In an alternate embodiment, the orientation and curvature of the front and rear wind-channeling and the rear, pressure reducing arcuate, contoured bodies 46 is consistent with the foregoing embodiment, but the positions of the masts 58 and terminal ends 60 of the bodies 46 are inverted. Therefore, the masts 58 support the side edges 56 of the arcuate bodies 46 at the outer circumferential edges 22 and between the outer circumferential edge 22 of the platform 12 and the platform's center axis 18 and the terminal ends 60 of the arcuate bodies 46 are adjacent the front and rear peripheral edges of the turbine 24. In yet another alternative embodiment, a second turbine 24 and second set of front and rear wind-channeling and rear, pressure reducing arcuate, contoured bodies 46 are provided along with the first turbine 24 and first set of arcuate contoured bodies 46 both equally spaced one side of a transverse or lateral center axis 28 of the rotatable platform 12 and offset from the platform's 12 center axis 18, as illustrated in the figures.

In an additional embodiment illustrated in the figures, a wind power generation assembly 10 includes a pole-mounted assembly including a pole-mounted turbine and sail assembly. A turbine 26 and sail assembly 14 mounted to an upper support portion 62 of the mounting pole 64. The upper support portion 62 includes a lower bracket plate 66 through which the mounting pole 64 extends at the lower edge of the turbine 24 and sail assembly 14 to an upper bracket plate 68 at the upper end 62 of the mounting pole 64. A central support bracket 70 is mounted and fixedly attached to the mounting pole 64 in between the upper 68 and lower 66 bracket plates and includes a pair of upper and lower support brackets 72, 74. The pair of upper 72 and lower 74 support brackets extend outwardly from the central support bracket 70 from a first end 76 attached to the central support bracket 70 to second ends 78 of each of the pair of upper 70 and lower 72 support brackets. The second ends 78 of each of the pair of upper 70 and lower 72 support brackets attach to upper 68 and lower 66 end plates, respectively, of a vertical-axis wind turbine (VAWT) 16 such that the VAWT 16 is securely mounted and suspended outwardly in radially-spaced relation from the mounting pole 64 by the upper 72 and lower 74 support brackets.

A pair of panels 14 are mounted to and extend arcuately and radially outward from each side of the VAWT 16. In a preferred embodiment, the panels 14 are pliable and collapsible sails and include sail bodies 46 which are constructed of material which is pliable but also has sufficient strength and durability to withstand harsh conditions and channel high speed winds into the turbine assembly 16 without compromising the structure of the sails, such as high strength nylon or carbon composite fabrics. Specifically, the bodies of each of the sails include a lateral side edge 56 which is affixed along the length thereof to a pole or mast 64. An upper 54 and lower 52 free edge extends outwardly in an arcuate or curvilinear fashion from the top and bottom ends of the lateral side edge 56, respectively, to connect at an outer free end opposite the fixed lateral side edge 56, thus defining the sail bodies 46 as having a substantially triangular profile with contoured, arcuate upper and lower free edges.

The poles or masts 64 are secured to the VAWT 16 and held on either side thereof to extend arcuately and radially outward from each side of the VAWT 16 by the upper 68 and lower 66 end plates of the turbine 26. The upper 68 and lower 66 end plates of the turbine 26 each include a front edge which is proximal to the support pole 64 and a rear edge which is oriented opposite to the support pole 64 and central support bracket 70 as well as first and second side edges which extend therebetween. In one embodiment, the first and second side edges of each of the upper 68 and lower 66 end plates have sets of cut-out notches 84 which lead to and terminate in notched apertures within the interior surface of the end plates are axially aligned between the upper 68 and lower 66 end plates.

Preferably, a first set of aligned cut-out notches 84 are provided in a first side edge of the upper 68 and lower 66 end plates, wherein the notches 84 lead to and terminate in notched apertures within the interior of the upper 68 and lower 66 plates. The first set of notches 84 lead to apertures which are oriented to receive and secure a first pole 64 of a first sail 14 in front of the rotational axis of the VAWT 16, in between the center axis of the support pole 58 and the axis 28 of rotation of the VAWT 16.

Furthermore, the first set of notches 84 and apertures is provided within the body of the end plates at a first distance such that the notches 84 and apertures are adjacent the first side edges of the end plates. A second set of aligned cut-out notches 86 which terminate in notched apertures is provided in a second side edge of the upper 68 and lower 66 end plates. The second set of notches 86 lead to apertures which are oriented to receive and secure a second pole 64 of a second sail 14 to the rear of the rotational axis 28 of the VAWT 16.

Furthermore, the second set of notches 86 and apertures is provided within the body of the end plates at a second distance which is greater than the first distance such that the second pole 64 of a second sail 14 are held further within the exterior of the end plates at a position substantially behind the VAWT 16. The frontwardly and rearwardly oriented positions as well as the differing depths that the sails 14 are mounted to the upper 68 and lower 66 plates of the VAWT 16 provide the sails 14, when opened, with opposing, arcuate contours which direct prevailing wind into the rotatable housing 36 of the VAWT 16 at differing tangiential paths to optimize the rotation and efficiency of the VAWT 16.

The central support bracket 70 also includes a cable extension beam 88 having a first end attached to the central support bracket 70 to a second free end which extends transversely and perpendicularly outward from the central support bracket 70 and mounting pole 64 opposite the pair of upper 68 and lower 66 support brackets. The second free end of the cable extension beam 88 includes a pair transverse of cable retaining apertures or notches disposed therethrough to receive and support sail deployment cables 90 and assembly anchor cables 92. Preferably, a center axis of the cable extension beam is perpendicular to the center axis 28 of the VAWT 16 and additionally intersects and aligns with the midpoint of the VAWT's center axis 28.

A pair of sail extension rods 94 are each pivotally and removably attached at a first end to the central support bracket 70 in between and on either side of the cable extension beam 88 and the pair of upper 80 and lower 82 support brackets and extend to a second, free end having apertures or notches which receive sail deployment cables 90. When connected to the central support bracket 70, each sail extension rod 94 extends outwardly from the central support bracket 70 along a center axis which is transversely perpendicular to that of the cable extension beam 88 and longitudinally perpendicular to the mounting pole 84 with the free ends of each of the sail extension rods 94 attached to the outer free ends of each of the sail bodies 14.

Additionally, a system of sail deployment cables 90 and assembly anchor cables 92 are provided to support and maintain the sails 14 drawn outward in an open or deployed position and additionally to secure the pole-mounted turbine 26 and sail assembly 14 to a support platform 12 or the ground. A first end of longitudinal assembly anchor cable 92 is secured to and extends from the front end of the upper 68 end plate of the VAWT 16 to an attachment to the upper support bracket 72 of the mounting pole 64, thereafter extending angularly downward from its attachment to the upper support bracket 72 through the cable retaining aperture of the second free end of the cable extension beam 88. From the cable extension beam 88, the longitudinal assembly anchor cable 92 extends at an angle downwardly to an attachment to the lower support bracket 74, and finally extends from the lower support bracket 74 to a second end which is anchored to a support platform 12 or the ground.

A longitudinal sail deployment cable 90 extends from a first attachment point at the upper support bracket 72 of the mounting pole 64 angularly downwardly and outwardly to attach to each free end of each of the sail extension rod 94 and the outer free ends of each sail body 46. From the free ends of the sail extension rods 94 and outer free ends of the sail bodies 46, the longitudinal sail deployment cable 90 extends downwardly and inwardly to an attachment to the lower support bracket 74, and finally to terminal ends which are anchored to a support platform 12 or the ground. A transverse sail deployment cable 90 is also provided, and is attached to each free end of each of the sail extension rod 94 and the outer free ends of each sail body 46, and is supported at its midpoint to a cable retaining aperture of the second free end of the cable extension beam 88.

Alternately, the VAWT 16 offset may be reduced or eliminated by motorizing and actively controlling the assemblies alignment to the prevailing wind.

Figure 1:
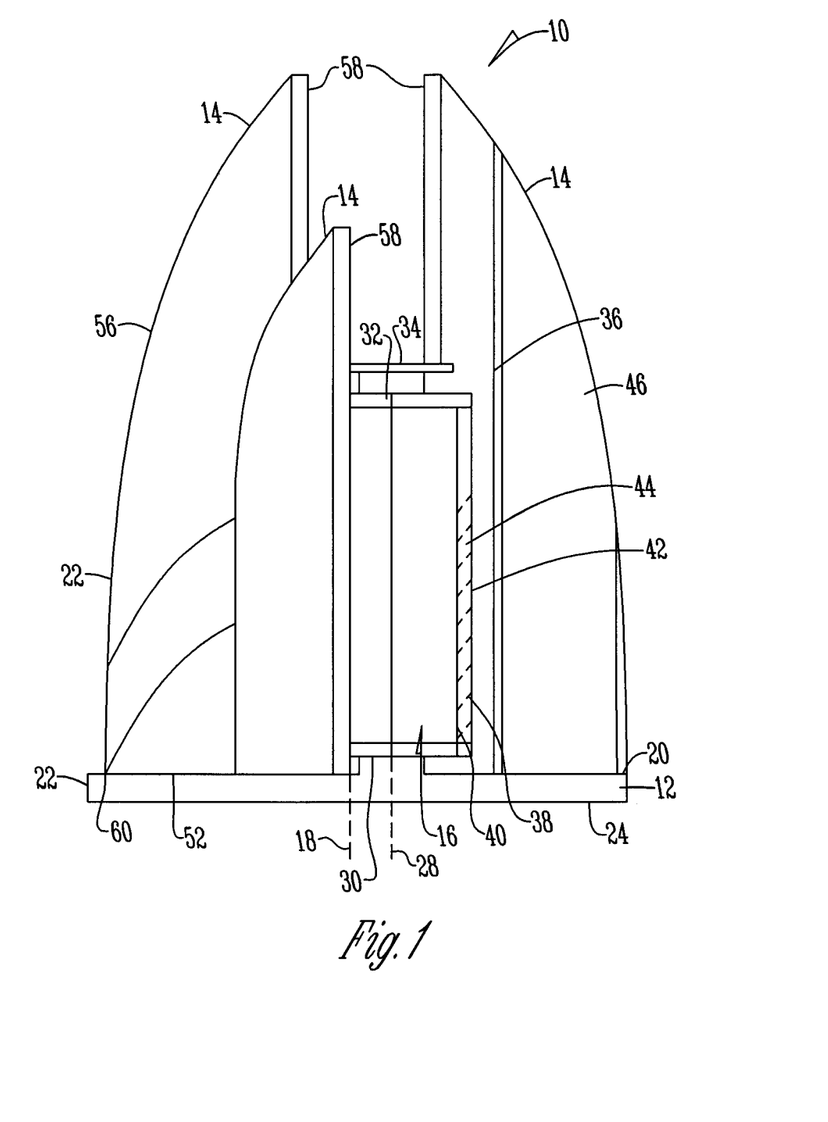
FIG. 1 is a side elevation view of a wind power generation assembly.
Figure 2:
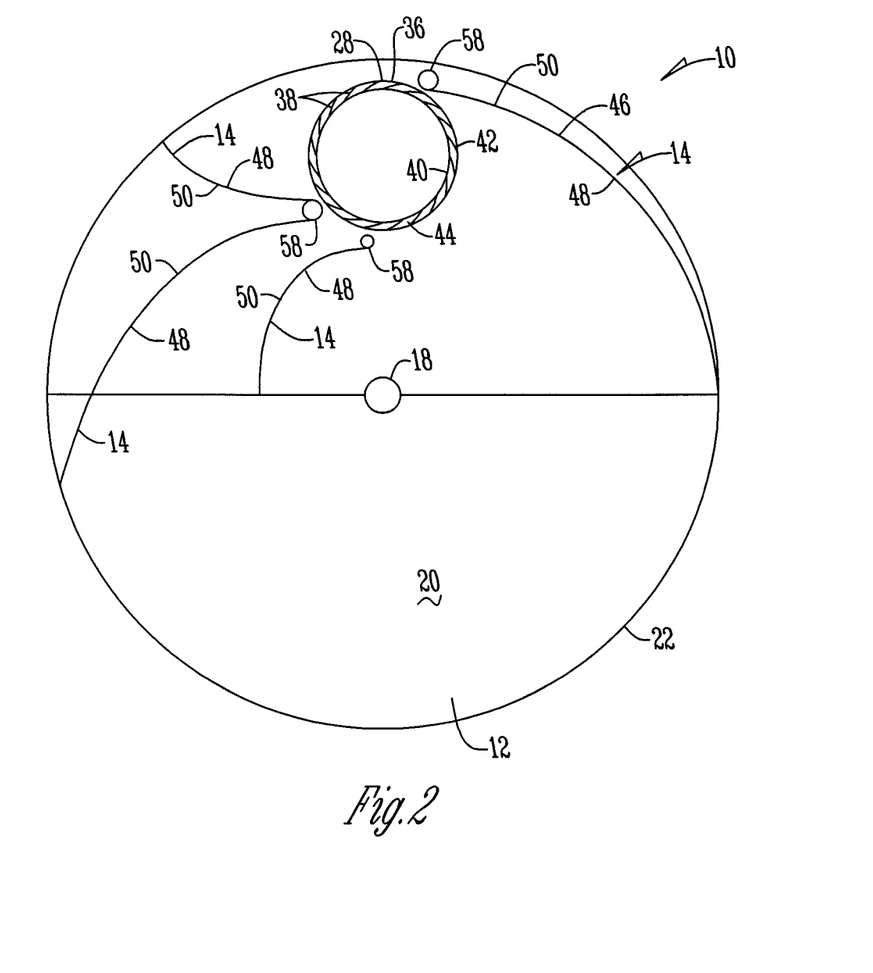
FIG. 2 is a top plan view of a wind power generation assembly.
Figure 3:
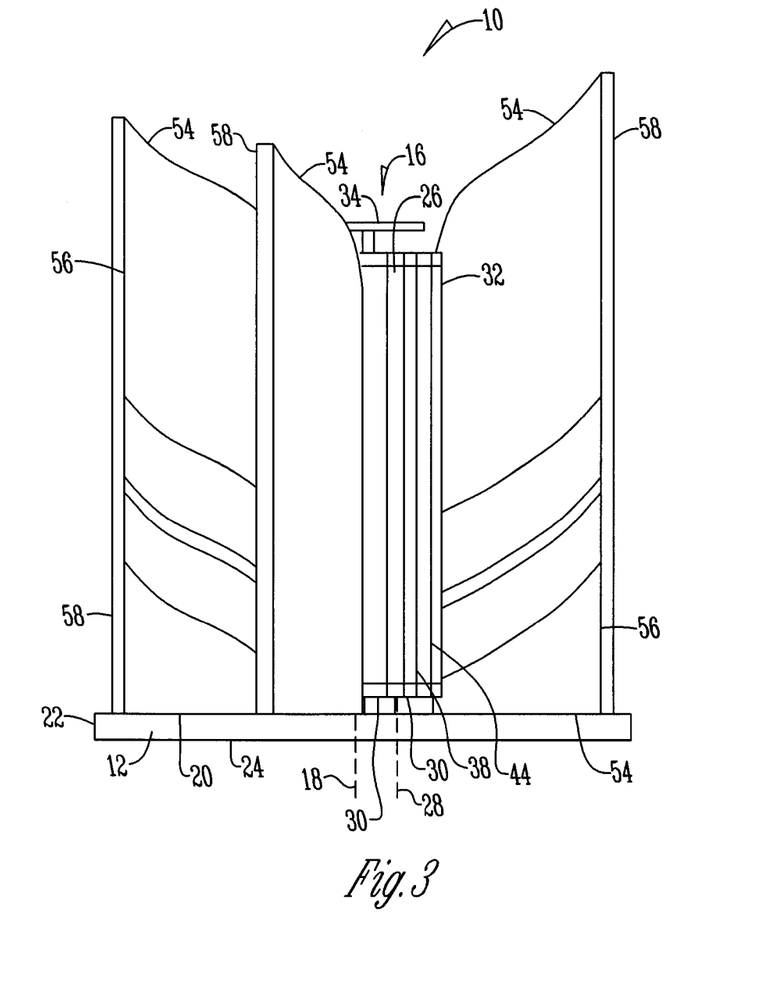
FIG. 3 is a side elevation view of a wind power generation assembly.
Figure 4:
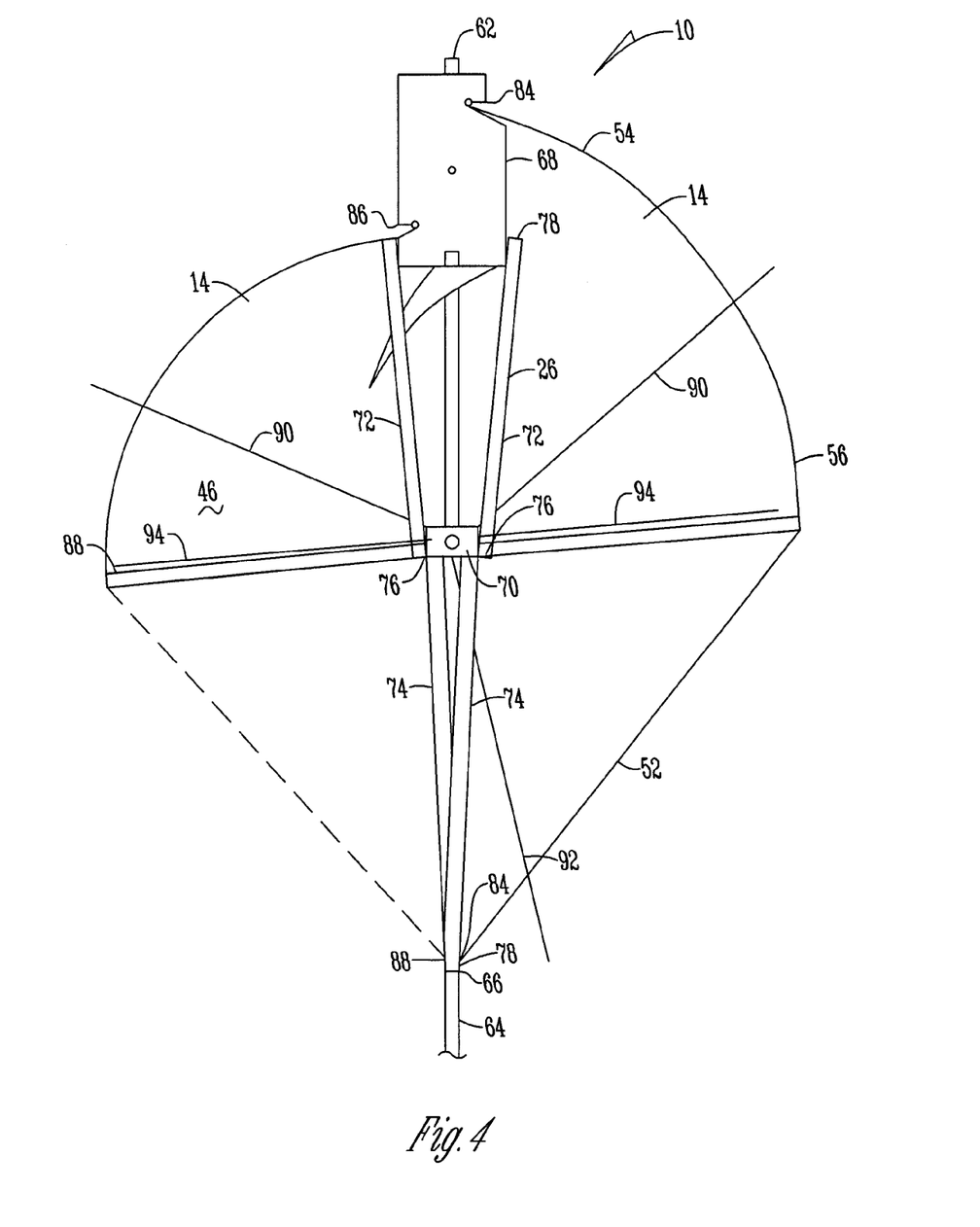
FIG. 4 is a partial side elevation view of a wind power generation assembly.
Figure 5:
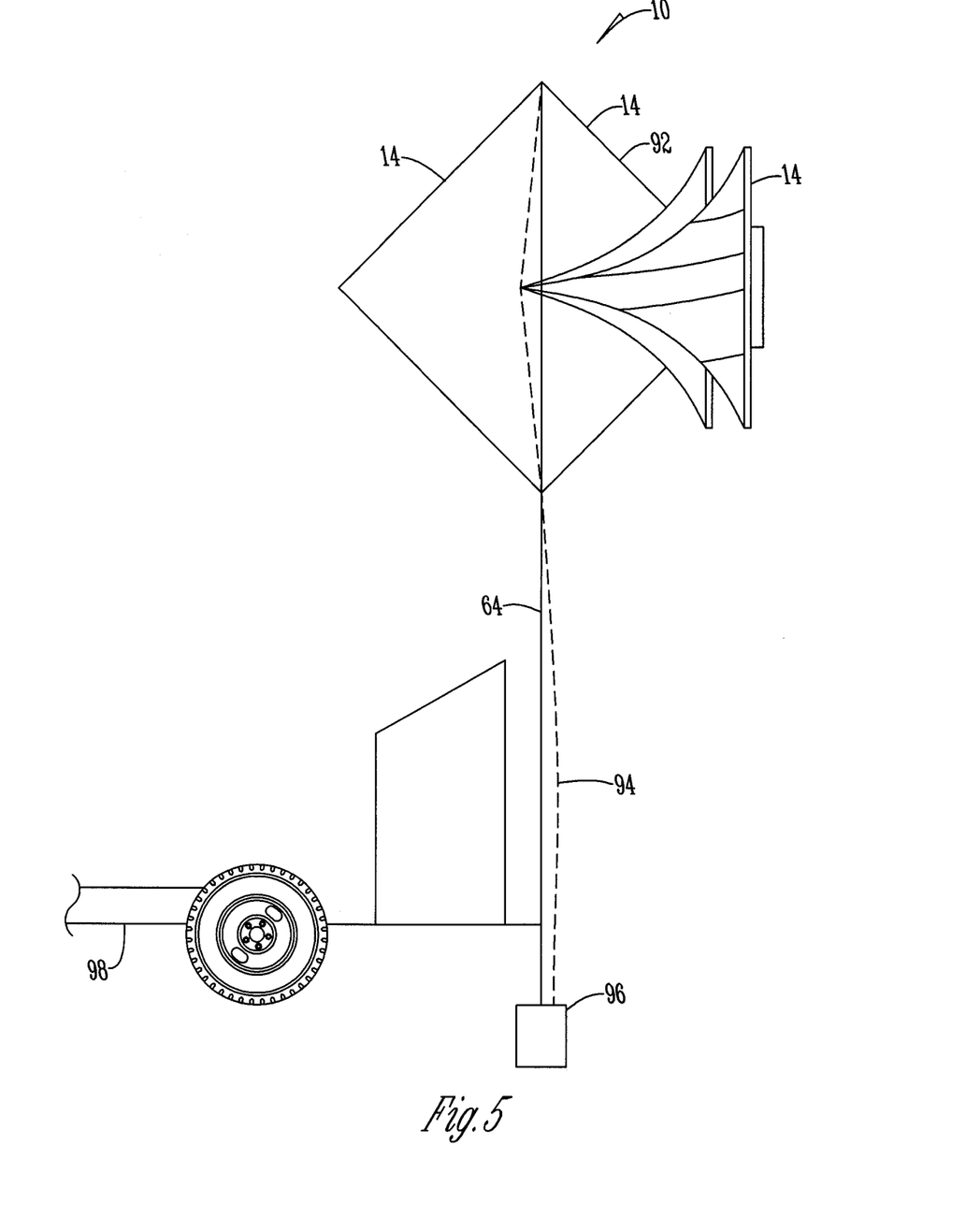
FIG. 5 is a side elevation view of a wind power generation assembly.
Figure 6:
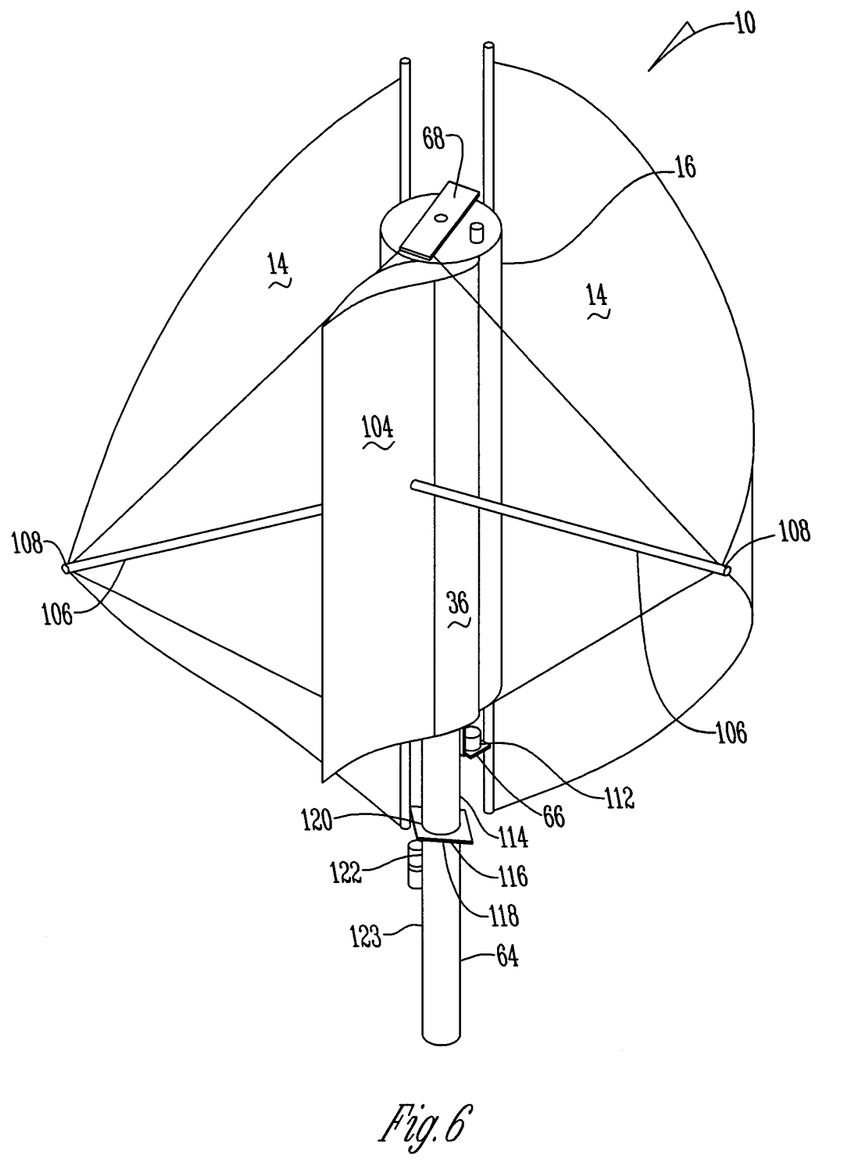
FIG. 6 is a perspective view of a wind power generation assembly.
Figure 7:
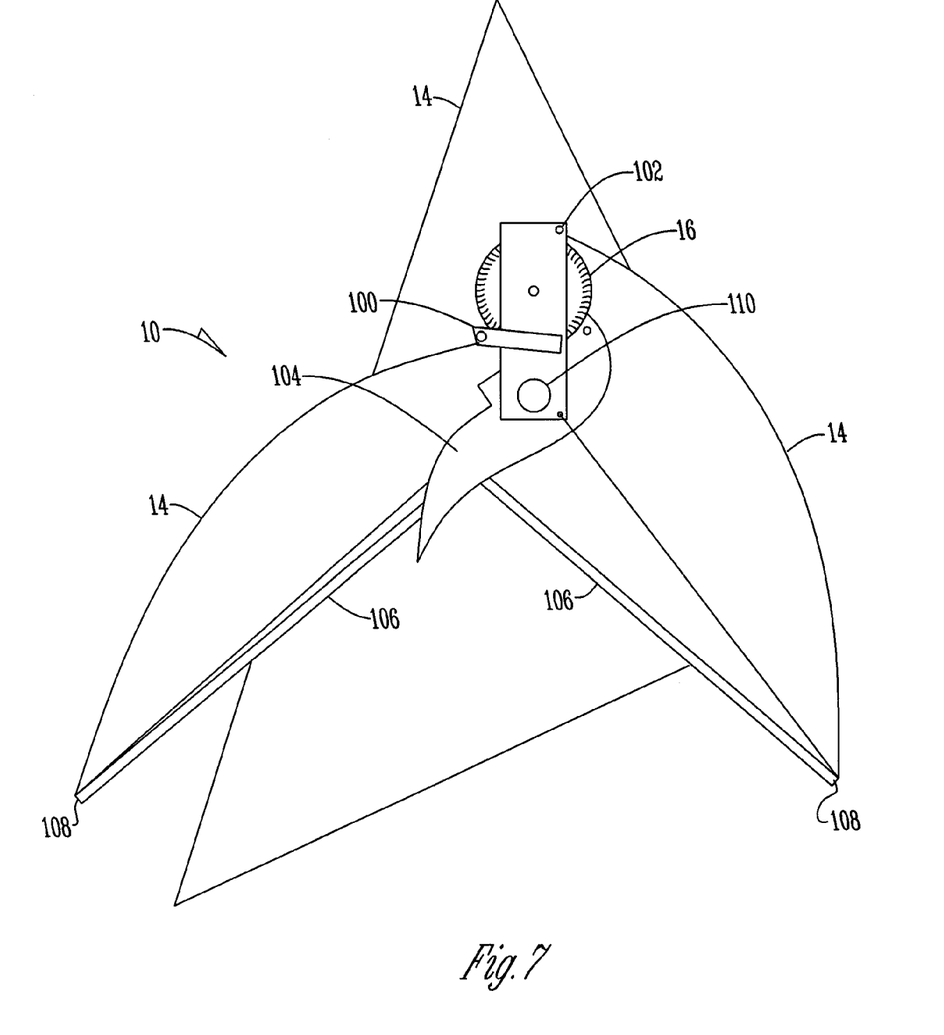
FIG. 7 is a top plan view of a wind power generation assembly.
Figure 8:
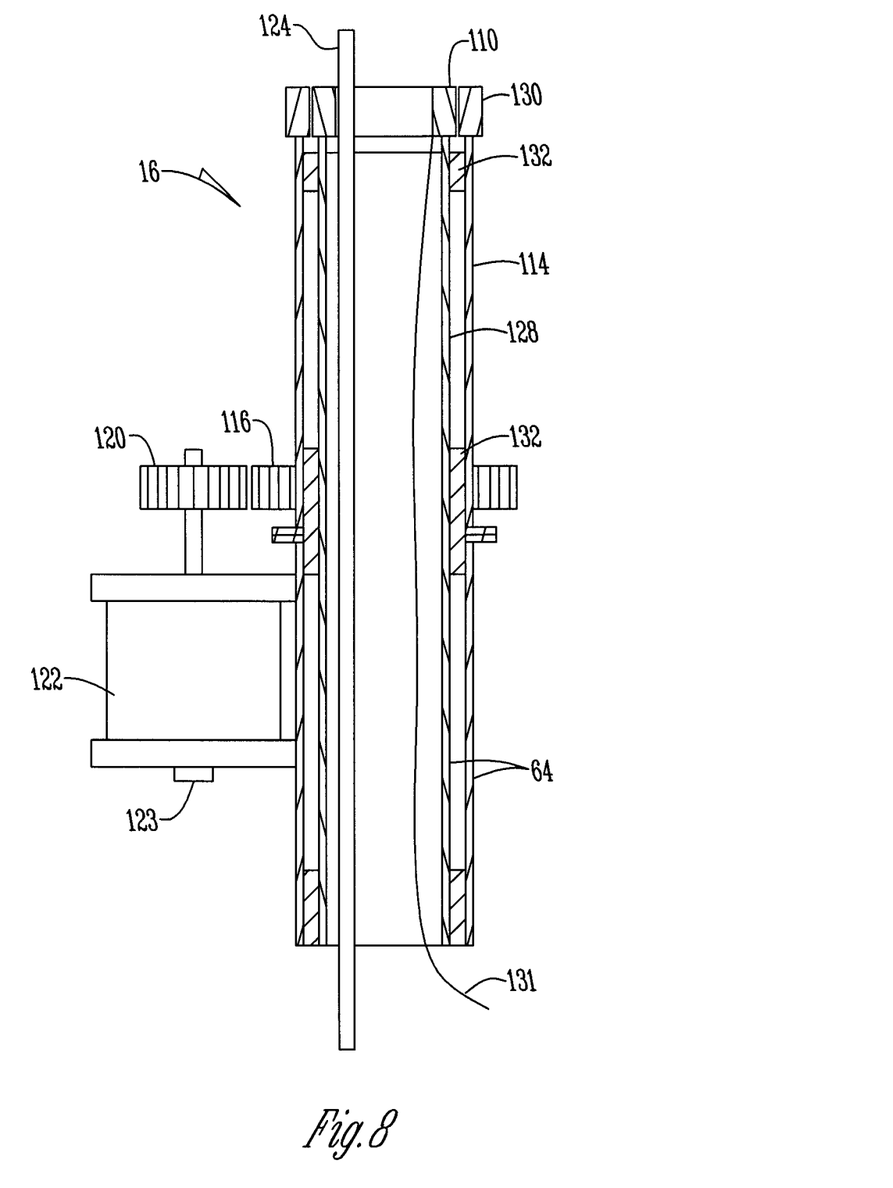
FIG. 8 is a partial side sectional view of a wind turbine assembly.

In yet another embodiment, as shown in FIGS. 6-8, the assembly 10 has a wind turbine assembly 16 connected to a mounting pole 64 with upper 68 and lower 66 brackets. A pair of panels 14 are connected to the upper and lower brackets 68, 66 through upper and lower panel brackets 100, 102. An airfoil 104 is connected to the outer cylindrical housing 36 of the turbine assembly 16 and extends away from the other two panels 14. The airfoil 104 has different profiles on the front and the back to reduce turbulence and improve airflow concentration in the front and the back of the turbine 24. Support rods 106 are connected to the airfoil 104 and extend to an outer edge 108 of the panels to position and support the panels 14 in relation to the turbine assembly 16. An electric slip ring 110 is mounted to the top of the turbine assembly 16 and a generator 112 supported by the lower bracket 66 is connected to the bottom of the turbine assembly 16. The positioning of the generator 112 in the wind stream assists in cooling the generator 112.

The lower bracket 66 is connected to a rotatable sleeve 114 that surrounds the mounting pole 64. The rotatable sleeve 114 also fits within a primary alignment gear 116 that is rotatably supported by a gear platform 118 that fits about pole 64. A secondary alignment gear 120 is operatively connected to the primary gear 116 and is driven by a motor 122 that is connected to the gear platform 118. In a preferred embodiment the motor is activated and controlled based upon a wind direction sensor 123 which aligns the assembly to the prevailing wind. Alternatively, the wind direction sensor 123 and motor 122 may be used to mis-align the turbine 24 and panels 14 to reduce efficiency under high wind conditions.

In an exemplary embodiment, the mounting of the turbine assembly 16 included a lightning rod 124 that extends from the ground, through the wind turbine 24 and out the top 126 of the turbine assembly 16. The top 126 of assembly 16 has a stationary electrical slip ring 110 that is supported by an inner pole 128 and a rotating electrical slip ring connector 130 that is supported by the rotatable sleeve 114. The slip ring 130 may transmit power to the base through generator wires 131. The inner pole 128 and sleeve 114 are separated by bearings 132 preferably made of Delrin or Nylon. Bearings 132 also separate sleeve 114 from the mounting pole 64. The use of the Delrin/Nylon bearings reduces both cost and wear.

In operation, the panels 14 are aligned with a prevailing wind by activating motor 122 which turns secondary gear 120, primary gear 116 and sleeve 114. The rotation of sleeve 114 rotates the panels 14, turbine assembly 16, and airfoil 104 to an optimum position. In an optimum position the wind channeling surface 48 of the panels 14 captures the wind in an efficient manner and redirects the wind without turbulence to the wind turbine 24. As a result, the assembly 10 can withstand high winds and avoids stalling in low winds.

This version may be permanently installed or be portably deployable to provide an additional degree of point-of-use, portable electrical power generation. The portable, pole-mounted assembly includes a mounting pole 64 having a detachable boot or rock plate 96 at a lower end. In operation, the collapsed pole-mounted turbine 26 and sail assembly is transported to a desired location via a transport trailer 98. The boot or rock plate 96 is secured within the ground or a suitable support foundation, and the lower end of the mounting pole 64 is received within and supported by the boot or rock plate 96 such that the pole is held erect and the pole-mounted turbine 26 and sail assembly supported thereupon. Next, sails 14 are deployed by tensioning the system of sail deployment cables 90 and assembly anchor cables 92 are provided to support and maintain the sails 14 drawn outward in an open or deployed position and additionally to secure the pole-mounted turbine 26 and sail assembly to a support platform 12 or the ground.

What is claimed is:

1. A wind power generation assembly, comprising:
a base having a planar top surface and an outer circumferential edge rotatably mounted about a center axis;
a wind turbine rotatably mounted to and extending upward from the planar top surface of the base about a second central axis offset from the central axis of the base; and a plurality of panels having an arcuate body with a wind engaging profile connected to at least one support extending from the base adjacent an outer circumference of the wind turbine.

2. The wind power generation assembly of claim 1 wherein the wind turbine is a vertical-axis wind turbine.

3. The wind power generation assembly of claim 2 wherein the panels are planar, arcuate sails.

4. The wind power generation assembly of claim 3 wherein the one or more supports are masts which are parallel to a vertical axis of the wind turbine.

5. The wind power generation assembly of claim 4 wherein the masts are adjacent to an exterior circumference of the turbine.

6. The wind power generation assembly of claim 1 further comprising a slip ring connected to the base to transmit power from the base.

7. The wind power generation assembly of claim 1 further comprising a pole secured to the base and attached to a vehicle.

8. The wind power generation assembly of claim 7 wherein the pole creates power used by the vehicle for operation.

9. The wind power generation assembly of claim 8 wherein the vehicle is a military vehicle.

10. The wind power generation assembly of claim 1 wherein the panels direct wind in opposite directions to a vertical axis of the wind turbine such that both a front and a back of the wind turbine receive concentrated wind energy to rotate the wind turbine.

11. The wind power generation assembly of claim 10 wherein a generator is positioned in a concentrated wind stream.

12. The wind power generation assembly of claim 1 wherein the turbine has an airfoil.

13. The wind power generation assembly of claim 1 having a motor and gear assembly operatively connected to the panels and wind turbine.

14. The wind power assembly of claim 13 wherein the panels and wind turbine are aligned to a prevailing wind based upon a wind detection sensor.

15. The wind power generation assembly of claim 13 wherein the panels and the wind turbine are mis-aligned with respect to the prevailing wind by a wind detection sensor.

16. The wind power assembly of claim 1 having a slip ring connector attached to the wind turbine.

* * * * *